Figure 1:
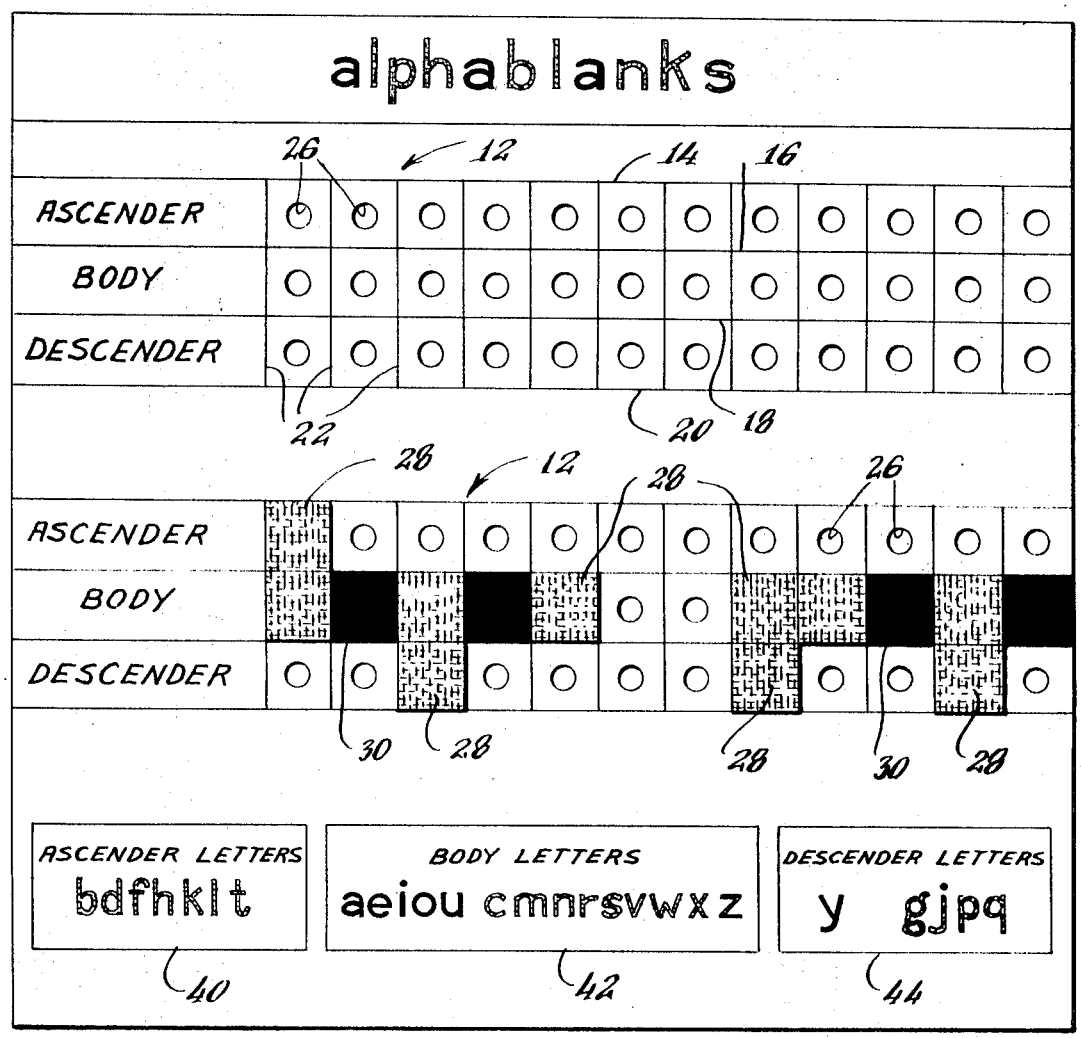

ated Oct. 12, 1971

United States Patent

[11] 3,612,536

[72] Inventor Rosalie R. Saul
    94 Deer Hill Ave., Danbury, Conn. 06810
[21] Appl. No. 858,735
[22] Filed Sept. 17, 1969
[45] Patented Oct. 12, 1971

[54] WORD GAME AND TEACHING ASSEMBLY
    7 Claims, 2 Drawing Figs.

[52] U.S. Cl. ................................................. 273/153 R,
    273/130 R, 273/136 A, 273/136 B, 273/136 C,
    35/35 H
[51] Int. Cl. ............................................................ A63f 9/06
[50] Field of Search .......................................... 273/130,
    153, 132, 135, 155; 35/35

[56] References Cited
    UNITED STATES PATENTS
De. 32,049  12/1899  Kughler ....................... 273/153 X
626,863     6/1899   Flack .......................... 273/132
3,377,071   4/1968   Treinis ........................ 273/155
3,393,914   7/1968   Hill ........................... 273/135

FOREIGN PATENTS
77,556      5/1918   Switzerland .................. 273/153

Primary Examiner—Delbert B. Lowe
Attorney—Blair, Cesari & St. Onge

ABSTRACT: An educational game apparatus which comprises a game board having one or more word rows with each word row divided up into a succession of alphabet character spaces. Each character space is divided into an upper ascender section, a middle body section, and a lower descender section. A game piece is selectively position in at least one section of each character space to describe the envelope of a group of letters forming a word to be ascertained. The game pieces are color coded to differentiate between vowels and consonants of the word.

INVENTOR.
Rosalie R. Saul
BY
Blair, Cesari & St.Onge
ATTORNEYS.

WORD GAME AND TEACHING ASSEMBLY

DESCRIPTION OF THE INVENTION

The present invention is used for a word game wherein game pieces on the game board form a word outline or envelope as a clue to a word to be ascertained by a player or players. The invention is particularly useful as an educational aid in the teaching of reading and language skills as well as a means of entertainment.

It is accordingly a principal object of the present invention to provide game apparatus having amusement value as well as educational value in enhancing reading and language skills. A further object of the invention is to provide an educational game which requires mental concentration in order to play successfully.

Other objects of the invention will in part be obvious and will in part appear hereinafter.

The present invention is premised on the fact that, with certain alphabet styles, a group of letters forming a word has a distinctive profile or envelope which one can come to recognize. That is, some letters of the alphabet are tall and others have tail portions extending below the line. The remainder of the letters are neither tall nor have tail portions and may be considered as having only a body portion. For example, *t* is a tall letter, while *g* has a tail extending below the line. Letters such as *m* and *n* merely have bodies, as do *t* and *g*, but no upper or lower extensions from their bodies. When the letters of a particular word are indicated solely in terms of whether they have upper or lower extensions from their body or no body extension at all, a rough profile or envelope of the particular word is described. Given clues, such as the category of the word definition and an indication of which of the letters of the word are vowels and consonants, a player can render a calculated guess as to the identity of the word. The degree of difficulty would typically depend on the scope of the word clue and the number of letters of the word.

After sufficient use of the invention one can begin to immediately recognize certain words solely on the basis of their profile, thus enhancing reading and language skills.

In accordance with the invention, there is provided apparatus which includes a game board or card having at least one horizontal row formed thereon. Each row is divided up into a succession of alphabet character spaces, with each character space sectioned off into a body section, an ascender section immediately above the body section, and a descender section immediately below the body section.

The game apparatus further includes a plurality of indicia. An indicia is selectively located in at least one section of each character space so as to describe the envelope of a group of letters of a predetermined alphabet style which, in combination, form a word to be ascertained. The indicia is preferably coded so as to differentiate between the vowel and consonant letters forming the word.

The indicia may take the form of rectangular game pieces which are placed in the requisite section or sections of each character space in order to describe the word envelope. Means may be provided for retaining each game piece in the particular section in which it is positioned. Specifically, in the disclosed embodiment of the invention, each of the three sections of each character space is provided with a hole drilled into or through the game board while the individual game pieces are provided with depending pegs which extend into the section holes upon placement of a game piece therein. Alternatively, the individual game pieces may carry small permanent magnets and at least the surface of the game board is provided with a magnetically permeable metal. The game pieces would then be held in place by magnetic attraction to the game board. It will also be appreciated that the individual game pieces may be adhesively attached to the game board upon placement in a particular character section.

The invention also contemplates that the indicia, rather than individual game pieces to be manually positioned in selective character sections, may take the form of lights or some form of changeable indicator permanently positioned in each character section.

To distinguish between the vowels and consonants making up the word to be ascertained, the indicia or game pieces may be color coded or otherwise visually differentiated, thus serving as a clue to the identity of the word in question.

The invention accordingly comprises the features of construction, combination of elements, and arrangement of parts which will be exemplified and the construction hereinafter set forth, and the scope of the invention will be indicated in the claims.

Figure 2:
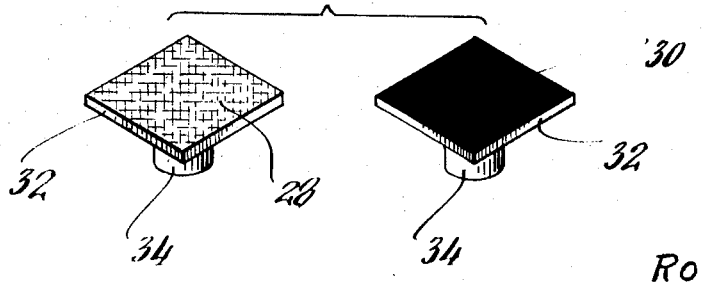

For a fuller understanding of the nature and objects of the invention, reference should be had to the following detailed description taken in connection with the accompanying drawing, in which:

FIG. 1 is a top plan view of a game board constructed according to a preferred embodiment of the invention; and FIG. 2 comprises a pair of perspective views of differentially color coded game pieces for use in conjunction with the game board of FIG. 1.

Referring to FIG. 1, a game board, generally indicated at 10, is provided with one or more horizontal rows, generally indicated at 12, which for purposes of the present description shall be termed "word" rows. Each word row 12 is subdivided into three separate horizontal rows by lines 14, 16, 18 and 20. The upper row of each word row 12 is designated the "ascender" row, the middle row is designated the "body" row, and the lower row is termed the "descender" row.

Each word row is further subdivided into a plurality of alphabet character spaces by a series of vertical lines 22. The surface of the game board 10 is therefore provided with one or more word rows 12, with each word row subdivided into a horizontal succession of three vertically aligned squares, which for purposes of the present description are termed the ascender, body and descender sections. Preferably, a suitable legend to the left of each word row 12 is provided to designate these sections of the character spaces.

While the game board 10 of FIG. 1 shows only two word rows, it will be appreciated that it can be expanded so as to provide space for any number of word rows. In addition, the width of the game board 10 can be enlarged so as to accommodate a greater number of character spaces than that shown in the drawing.

In the disclosed embodiment of the invention, a hole 26 is bored into or through the game board 10 at approximately the center of each ascender, body and descender section or square of each character space provided on the surface of the board. Referring to FIG. 2, a pair of game pieces 28 and 30 are shown having a flat rectangular body 32 with a peg 34 depending from the underside thereof. The size of the body 32 of the game pieces corresponds to the size of the individual sections or squares making up the word rows 12. The pegs 34, in turn, are sized to fit into the holes 26 formed in the game board such that when the game pieces are positioned in the squares their pegs enter the holes for retention therein.

As generally noted above, the present invention is premised on the fact that, with certain alphabet styles, some of the letters are tall, while others have tail portions extending below the line. The remainder of the letters of the alphabet are neither tall nor have tail portions, and may be considered as having only body portions. Referring to FIG. 1, there is imprinted near the bottom of game card 10 a particular alphabet style which illustrates the principles of the invention. The alphabet is broken up into three groups, consisting of ascender letters, as shown in block 40, body letters, as shown in block 42, and descender letters, as shown in block 44. The body letters grouped in block 42 are those letters of the illustrated alphabet style which are considered to have only body portions, that is, neither upper nor lower extensions. Such body letters are the vowels *a*, *e*, *i*, *o* and *u* and the consonants *c*, *m*, *n*, *r*, *s*, *v*, *w*, *x*, and *z*. The ascender letters, shown in block 40 on game board 10, have upper extensions from their body portions, and are *b*, *d*, *f*, *h*, *k*, *l* and *t* in the illustrated embodiment.

The descender letters, illustrated in block 44, are those letters of the alphabet having tails or lower extensions from their body portions and are the vowel y and consonants g, j, p and q.

In the employment of the apparatus to practice the present invention, a series of character spaces in a word row 12 are assigned the letters of a group forming a particular word to be ascertained. Those letters of the word which are ascender letters have game pieces positioned in both the ascender and body sections of the corresponding character space. The body letters of the word are represented by the placement of a game piece in only the body section of the appropriate character space. Game pieces are positioned in the body and descender sections of the appropriate character spaces in order to represent descender letters. It is thus seen that one can describe a rough envelope of the word in question by the selective placement of game pieces in the appropriate ascender, body and descender sections of the character spaces.

It will be appreciated that an individual attempting to ascertain the identity of the word in question sees only the rough envelope of the word as represented by selective placement of the game pieces on the game board. As a clue to the identity of the word, it is preferred to use different colored game pieces in order to represent the vowel and consonant letters of the word in question, as shown in FIG. 2. That is, a consonant may be represented by one or more game pieces having their upper surface colored yellow. The vowels of the word in question may be represented by game pieces colored black. Thus, an individual playing the game would see not only a rough profile of the word in question, but also which of the letters of the word are vowels and which are consonants. Preferably, the vowels and consonants imprinted in blocks 40, 42 and 44 are also colored black and yellow, respectively.

As a further clue to the identity of the word in question, it is preferred to give the player one or more clue words suggestive of the word in question. For example, a clue word such as "tool" may be given to a player attempting to identify the word "saw" represented on the game board 10.

To better illustrate practice of the present invention, the envelopes of a pair of five letter words are represented by the game pieces situated in the lower word row 12 of game board 10. It is seen that for the word to the left, the first letter is an ascender letter, i.e., one of the letters in block 40. Since this first letter is a consonant, yellow game pieces are used to describe its envelope. The second and fourth letters of the first word are body letters, i.e., those included in block 42, and are vowels since they are represented by black game pieces. The last letter is a body letter and a consonant, being represented by a yellow game piece. The third letter of the first word is a descender letter, one of those included in block 44, and is a consonant. If the clue word to suggest the identity of this word is "animal," the player would determine after some contemplation that the word in question was "tiger."

The second word in the lower word row 12 of game card 10 consists of a descender letter consonant, a body letter consonant, a body letter vowel, a descender letter consonant, and a body letter vowel. A suitable clue word to the identity of this word might be "fruit."

It will be appreciated that there are numerous ways in which the disclosed educational game may be played. For example, one player may position the game pieces to describe the envelop of a word and give an appropriate clue word to a second player who is to determine the identity of the word in question. Players may be grouped into teams of two, and the game played along the same format as the well-known game "Password."

It will be appreciated that the apparatus of the invention may take a wide variety of forms without departing from the teachings of the invention. The lines imprinted on the board defining the character spaces and sections thereof are for convenience only, and may be omitted. The game pieces may be adapted for magnetic or adhesive attraction to the game board 10. Alternatively, if the game board is laid flat, the game pieces may be simply rectangular bodies without provision for retension on the game board 10.

Rather than using the game pieces 28 and 30 as indicia for forming the word envelopes, changeable display elements, such as lights or panels, may be permanently positioned in each section of each character space and adjustably controlled so as to describe word envelopes, as well as to differentiate between the vowels and consonants of the word in question. In this form, the game is ideally suited for television production.

It will be further understood that rather than determining the identity of words from their profiles on an individual basis, the profiles of a plurality of words making up a sentence, saying or quotation may be presented on the game board.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described the invention, what is claimed as new and is desired to secure by Letters Patent is:

1. Apparatus for an educational game in which participants are asked to identify words from a display of the approximate word envelope, comprising, in combination:
   A. a game board having
      1. at least one horizontally defined space forming a word row on the surface thereof,
      2. each said word row being vertically divided into three separate areas consisting of an upper ascender row, a middle body row and a lower descender row,
      3. a succession of groups of vertically aligned sections in said ascender, body and descender rows, said groups of vertically aligned sections forming columns with each said column of ascender, body and descender sections in turn defining a character space, and
   B. nonalphabetic indicia means displayable in at least one said section of selected ones of said character spaces to thereby define the approximate envelope of a group of letters of a predetermined alphabet style forming a word to be identified,
      1. said indicia means being provided with visual coding means to differentiate between vowels and consonants.

2. The educational game apparatus defined in claim 1, wherein a legend is provided on said board adjacent each said ascender, body and descender rows to identify said ascender, body and descender sections of each said character space.

3. The educational game apparatus defined in claim 1, wherein said game board further has three surface area portions having imprinted thereon letters of said predetermined alphabet style, one area containing body letters, each representable by indicia means displayed in said body section of a character space, the second area containing ascender letters, each representable by indicia means displayed in both said body and ascender sections of a character space, and the third area containing descender letters, each representable by indicia means displayed in said body and descender sections of a character space.

4. The educational game apparatus defined in claim 1, wherein said indicia means are in the form of a plurality of individual game pieces, each one of said game pieces having means for securing same to at least one of said sections, and being of a size and shape to substantially cover said section.

5. The educational game apparatus in claim 4, wherein said visual coding means consist of different colors applies to said game pieces.

6. The educational game apparatus defined in claim 4, wherein said game board includes means forming a hole substantially centrally located in each said section, each said game piece having a peg depending therefrom, said peg being sized for engagement in one said hole when said game piece is positioned on said board.

7. Apparatus for an educational game in which participants are asked to identify words from a display of the approximate word envelope, comprising, in combination:
A. a game board having
1. at least one horizontally defined space forming a word row on the surface thereof,
2. each said word row being vertically divided into three separate areas consisting of an upper ascender row, a middle body row and a lower descender row,
3. a succession of groups of vertically aligned sections in said ascender, body and descender rows, said groups of vertically aligned sections forming columns with each said column of ascender, body and descender sections in turn defining a character space,
4. means forming a hole substantially centrally located in each said section, and
B. a plurality of individual, nonalphabetic game pieces,
1. each said game piece having a peg depending therefrom, said peg being sized for engagement in one said hole when said game pieces are positioned in said character spaces to define the approximate envelope of a group of letters of a predetermined alphabet style forming a word to be identified,
2. said game pieces further being color coded so as to distinguish between vowel and consonant letters in the word envelope defined thereby on said game board.